United States Patent
Dan et al.

(10) Patent No.: US 6,948,171 B2
(45) Date of Patent: Sep. 20, 2005

(54) APPARATUS, SYSTEM AND METHOD FOR ACTIVE SCHEDULING OF TIME BASED EVENT-DRIVEN LONG RUNNING PROCESSES

(75) Inventors: Asit Dan, Pleasantville, NY (US); Daniel Manual Dias, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 09/835,800

(22) Filed: Apr. 16, 2001

(65) Prior Publication Data

US 2002/0152105 A1 Oct. 17, 2002

(51) Int. Cl.[7] ............................................. G06F 9/46
(52) U.S. Cl. ................. 718/100; 718/102; 709/231; 705/8; 705/9
(58) Field of Search ................. 718/100, 102, 718/106, 107, 101; 709/202, 223, 224, 220, 231; 705/7, 8, 9

(56) References Cited

U.S. PATENT DOCUMENTS

| | | | | |
|---|---|---|---|---|
| 6,016,478 A | * | 1/2000 | Zhang et al. | 705/9 |
| 6,519,763 B1 | * | 2/2003 | Kaufer et al. | 717/101 |
| 6,578,005 B1 | * | 6/2003 | Lesaint et al. | 705/8 |
| 6,615,166 B1 | * | 9/2003 | Guheen et al. | 703/27 |
| 6,721,713 B1 | * | 4/2004 | Guheen et al. | 705/1 |

* cited by examiner

*Primary Examiner*—Majid Banankhah
(74) *Attorney, Agent, or Firm*—Duke W. Yee; Rafael Perez-Pineiro; Wayne P. Bailey (57) ABSTRACT

An apparatus, system and method for active scheduling of event-driven long running processes are provided. The apparatus, system and method receive update information indicating a change in status of a subject of the active scheduling. Based on this changed status and stored scheduling rules, an adapted schedule is generated to accommodate the change in status. The adapted schedule is further modified based on historical information to compensate for historically predicted events that may conflict with events in the adapted schedule.

30 Claims, 4 Drawing Sheets

APPARATUS, SYSTEM AND METHOD FOR ACTIVE SCHEDULING OF TIME BASED EVENT-DRIVEN LONG RUNNING PROCESSES

BACKGROUND OF THE INVENTION

1. Technical Field

The present invention is directed to an improved data processing system. More specifically, the present invention is directed to an apparatus, system and method for active scheduling of time based event-driven long running processes.

2. Description of Related Art

Scheduling mechanisms for scheduling events that will occur in the future are generally known. Such scheduling mechanisms typically provide a fixed scheduling of events. That is, a user may input events into a scheduling mechanism which may then, at the designated scheduled time, or within a predetermined time period prior to the scheduled time, provide a reminder to the user of the scheduled event. Such scheduling is typically referred to as time based scheduling.

In addition to time based scheduling, other scheduling mechanisms include event driven scheduling. Event driven scheduling is characterized by a series of events that are set to occur one after the other. Thus, before a subsequent event is scheduled, a prior event must be scheduled and must be successfully performed. Thus, the scheduling is driven by each occurring event. Examples of such scheduling include computer job/task scheduling in which a series of tasks in a job are scheduled to occur in a sequence. As a result, subsequent events cannot occur until prior events are successfully performed. This is also known as workflow.

Such mechanisms provide only a fixed scheduling mechanism which does not take into consideration changes in situations that may give rise to a need to modify the schedule of the already entered events. Furthermore, such scheduling mechanisms do not take into consideration historical information that may affect the scheduling of events in the future. Therefore, it would be beneficial to have an active scheduling mechanism which takes into consideration historical information and changes in current situations to actively adapt a series of scheduled events.

SUMMARY OF THE INVENTION

The present invention provides an apparatus, system and method for active scheduling of event-driven long running processes. The present invention receives update information indicating a change in status of a subject of the active scheduling. This may include time expiring of a scheduled calendar event as well as failure of performing an event. Based on this changed status and stored scheduling rules, the present invention generates an adapted schedule to accommodate the change in status. The adapted schedule is further modified based on historical information to compensate for historically predicted events that may conflict with events in the adapted schedule. The schedules of the present invention may be distributed using a client-server distributed network, as software on a stand alone computing device, in a smartcard system, or the like. In one particular embodiment, the present invention may distribute the schedules at a time when an item is purchased, or when a life event occurs requiring scheduling of further related events.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As mentioned above, the present invention provides an active scheduling device that adapts a time based event driven long running process based on changes in a current status as well as historical information. In order to provide a context with regard to the environment in which the present invention may be implemented, the following FIGS. 1–3 are provided to describe various computing devices that may be used to implement the present invention.

Figure 1:
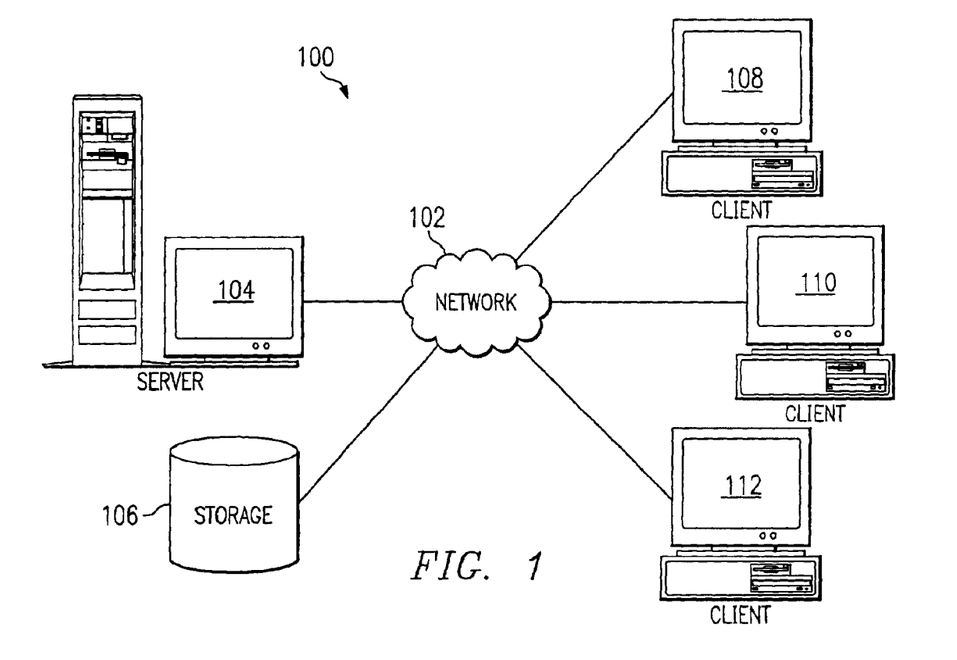
FIG. 1 is an exemplary block diagram of a network data processing system in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
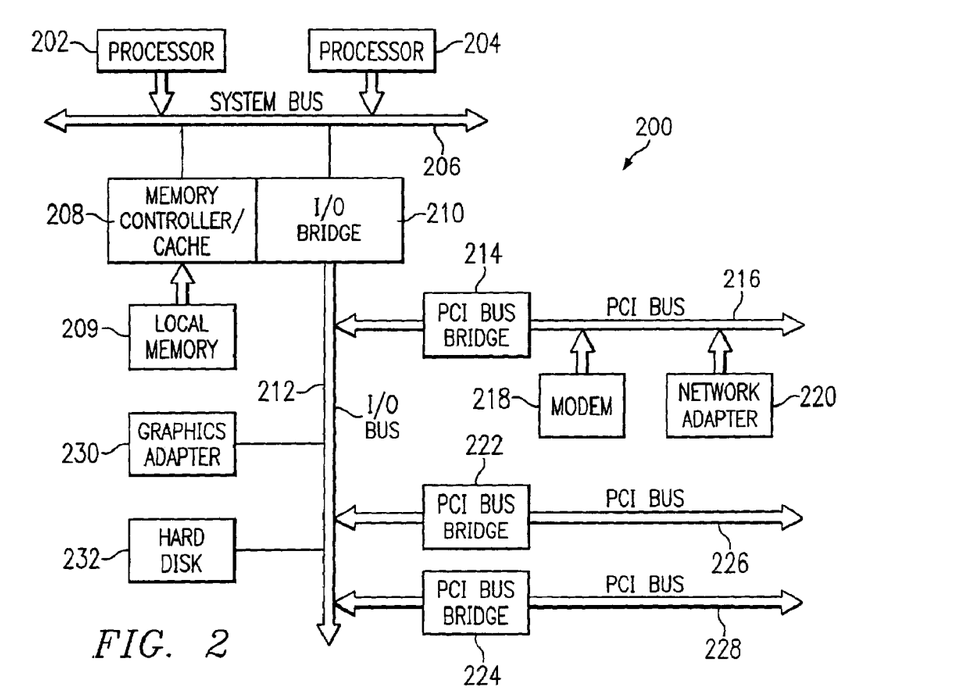
FIG. 2 is an exemplary block diagram of a server in accordance with the present invention.
Figure 3:
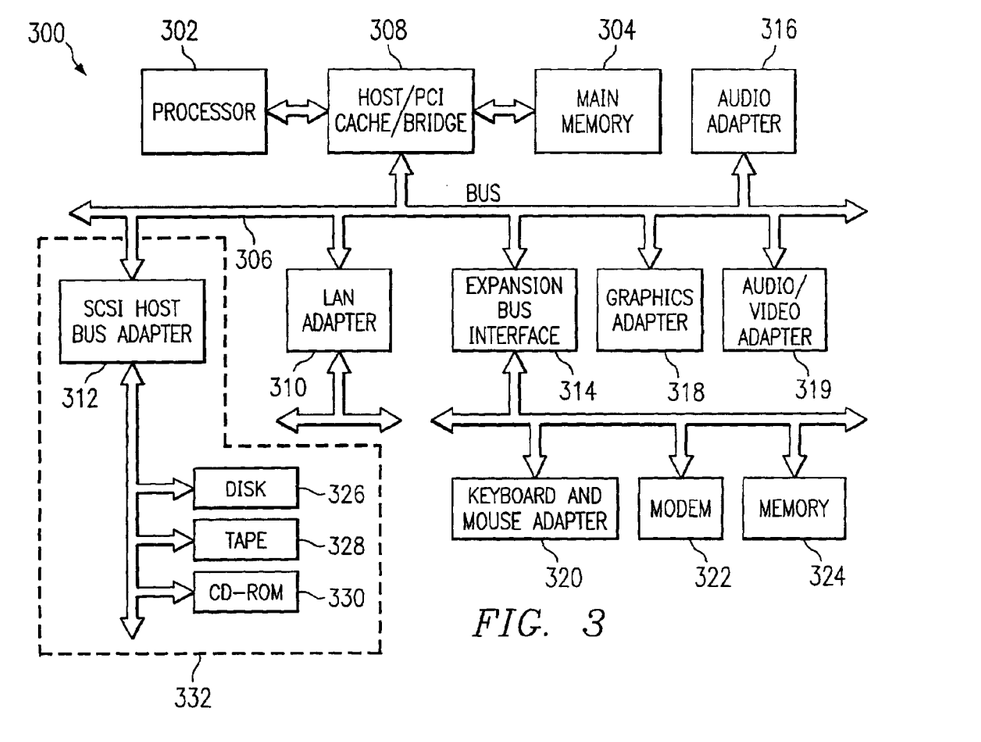
FIG. 3 is an exemplary block diagram of a client device in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 maybe integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance. The present invention provides a mechanism by which schedules of event-driven long running processes are actively adapted to changes in a current situation while taking into consideration historical information pertaining to the scheduling of events. With the mechanism of the present invention, an initial schedule of events is generated for a long running process of events. As events occur, or as situations change that may require changes in the initial schedule, the schedule of events for the long running process is adapted based on the initial schedule of events as well as stored rules for scheduling the events. The rules for scheduling the events provide an initial modified schedule which is again modified based on historical information. The final revised schedule is then generated and stored. An output of the revised schedule may be provided to a user.

Figure 4:
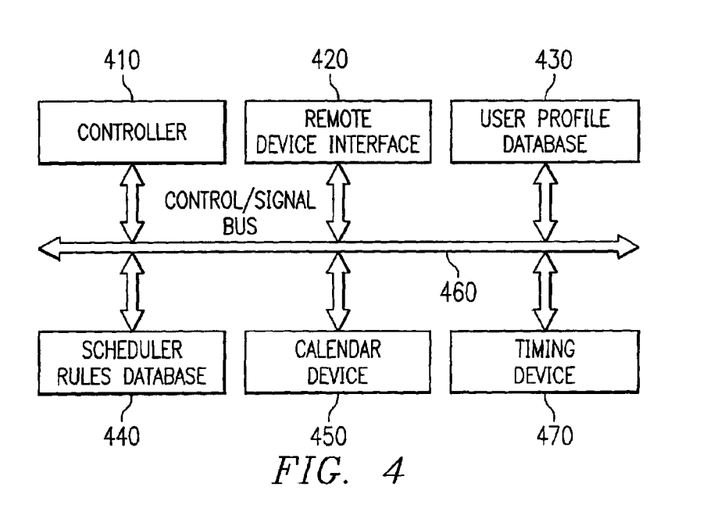
FIG. 4 is an exemplary block diagram of the primary components of the active scheduler according to the present invention.

FIG. 4 is an exemplary block diagram illustrating an active scheduling mechanism in accordance with the present invention. The elements shown in FIG. 4 may be implemented as software, hardware, or a combination of software and hardware. In a preferred embodiment, the elements of FIG. 4 are implemented as software instructions executed by a processor., such as processor 202 or 204 in FIG. 2 or processor 302 in FIG. 3.

As described above, the present invention may be implemented in a client device or a server. In the case of the present invention being implemented in a client device, the active scheduling mechanism manages schedules of events for one or more users of the client device. In the case of the present invention being implemented in a server, the active scheduling mechanism manages schedules of events for one or more users of one or more client devices coupled to the server via at least one network.

As shown in FIG. 4, the active schedule mechanism 400 includes a controller 410, a remote device interface 420, a user profile database 430, a scheduler rules database 440, a calendar device 450, and a timer device 470. These elements 410–450 are coupled to one another via the control/signal bus 460. Although a bus architecture is shown in FIG. 4, the present invention is not limited to such an architecture. Rather, any mechanism for providing the communication between elements 410–450 may be used without departing from the spirit and scope of the present invention.

The controller 410 controls the operation of the active scheduling mechanism 400. The controller 410 performs the functions of adapting established schedules of events stored in the user profile database 430 based on information received from remote devices via the remote device interface 420. The adapting of the schedule of events is performed based on scheduler rules in the scheduler rules database 440 and historical information for the particular user stored in the user profile database 430. The calendar device 450 is used to output the adapted schedule of events to the user.

The controller 410, at the request of a user, establishes an initial schedule for a long running time based event driven process having a plurality of events that are interrelated such that changes to the scheduling of one event may affect the scheduling of other events in the process. The initial schedule may be generated based on a set of scheduling rules stored in the scheduler rules database 440 and parameters entered by the user. For example, if the process is a vehicle maintenance schedule, the user may request that the active scheduler schedule his/her vehicle maintenance for the life of the vehicle. The user may further enter information pertaining to the make and model of the vehicle, current mileage of the vehicle, and last known dates of maintenance on the vehicle.

In addition to setting up an initial schedule for a long running process, the present invention provides an "active" scheduler for actively updating the schedule of events based on a current status and historical data. The current status information may be obtained from one or more local or remotely located devices. In a preferred embodiment, the current status information is obtained from a remotely located device via the remote device interface 420. For example, the remotely located device may be the automobile owned by the user in the example above. The computer control unit in the automobile may be equipped with a wireless transceiver through which the automobile may receive requests for current status information and transmit current status information.

The updating of the schedule may be performed when a change in status is reported to the active scheduler, at predetermined periodic intervals, or the like. For example, the present invention may perform updates of the schedule by sending a request out to a remote device, via the remote device interface 420, and receiving a response to the request. Based on the current status reported by the remote device, the active scheduler may update the schedule of events for the long running process. For example, the active scheduler may send out a request for the current status of the automobile of the user every two weeks. Based on this information, the initial schedule of events for the long running process may be updated based on the current status of the automobile.

Moreover, rather than having to request current status information, the remote device may be made to report current status information to the active scheduler when changes in the status of the subject of the scheduling occur. Thus, for example, if the user of the automobile were to go into a mechanic shop and have the automobile's oil changed, this information may be reported to the active scheduler and the vehicle's maintenance schedule updated automatically.

In addition to adapting a schedule based on changes in current status information for a subject of the long running process, the present invention makes use of historical information stored in the user profile database 430 to adjust the schedule based on a prediction of events in the future. For example, the historical information may indicate that the user of the automobile typically takes a vacation during the period of March 12 to March 18. Thus, if there is a maintenance event that is to be scheduled during this time period based on either an initial schedule or an adapted schedule that has been adapted based on a change in the current status of the automobile, the event may be rescheduled for a time after March 18.

The historical data and historical events used to adjust the schedule of the long running process may be directly or indirectly related to the subject of the scheduling. For example, the vacation example stated above is an example of an indirectly related historical event. A directly related historical event may be, for example, a determination that the user typically does not drive the automobile as often in March as in other times of the year. Thus, while an oil change may generally be scheduled for March, the time period between oil changes may be increased such that the oil change is scheduled for the end of April due to the lower number of miles driven in March. Other types of directly related and indirectly related historical events may be used to adjust the scheduling of the long running process in accordance with the present invention.

The timing device 470 is used as a mechanism for determining what events to inform the user of and when to inform the user. The timing device 470 may be used, for example, to provide a warning to the user that an event is scheduled to occur within an hour, day, week, or the like, of the current time. The timing device 470 may further be used to determine what events are scheduled within a predetermined period of time of the present time in order to display or otherwise inform the user of only these events. For example, only events within five days of the current day may be displayed using the calendar device 450.

Moreover, the timing device 470 may be used to provide a "window of opportunity" for performing the scheduled events. In other words, each event may have an associated window of opportunity around the scheduled date/time in which the event may be satisfactorily resolved without having to reschedule other events. Thus, for example, if a vehicle maintenance schedule indicates that the vehicle should have an oil change on March 1, the oil change may have a window of opportunity of two weeks. If the user reports that the vehicle's oil has been changed within the two week window of opportunity, other events in the maintenance schedule may be kept at their original scheduled dates/times without having to be rescheduled.

In order to perform such "window of opportunity" analysis, the timing device 470 need only determine the time the scheduled event was satisfied and determine if that time is within the window of opportunity for the scheduled event. If so, the other events in the schedule need not be rescheduled (although they still could without departing from the spirit and scope of the present invention). If the time is not within the window of opportunity, the other events will need to be rescheduled to take into consideration the actual time that the event was resolved and any historical data, as described above.

Figure 5:
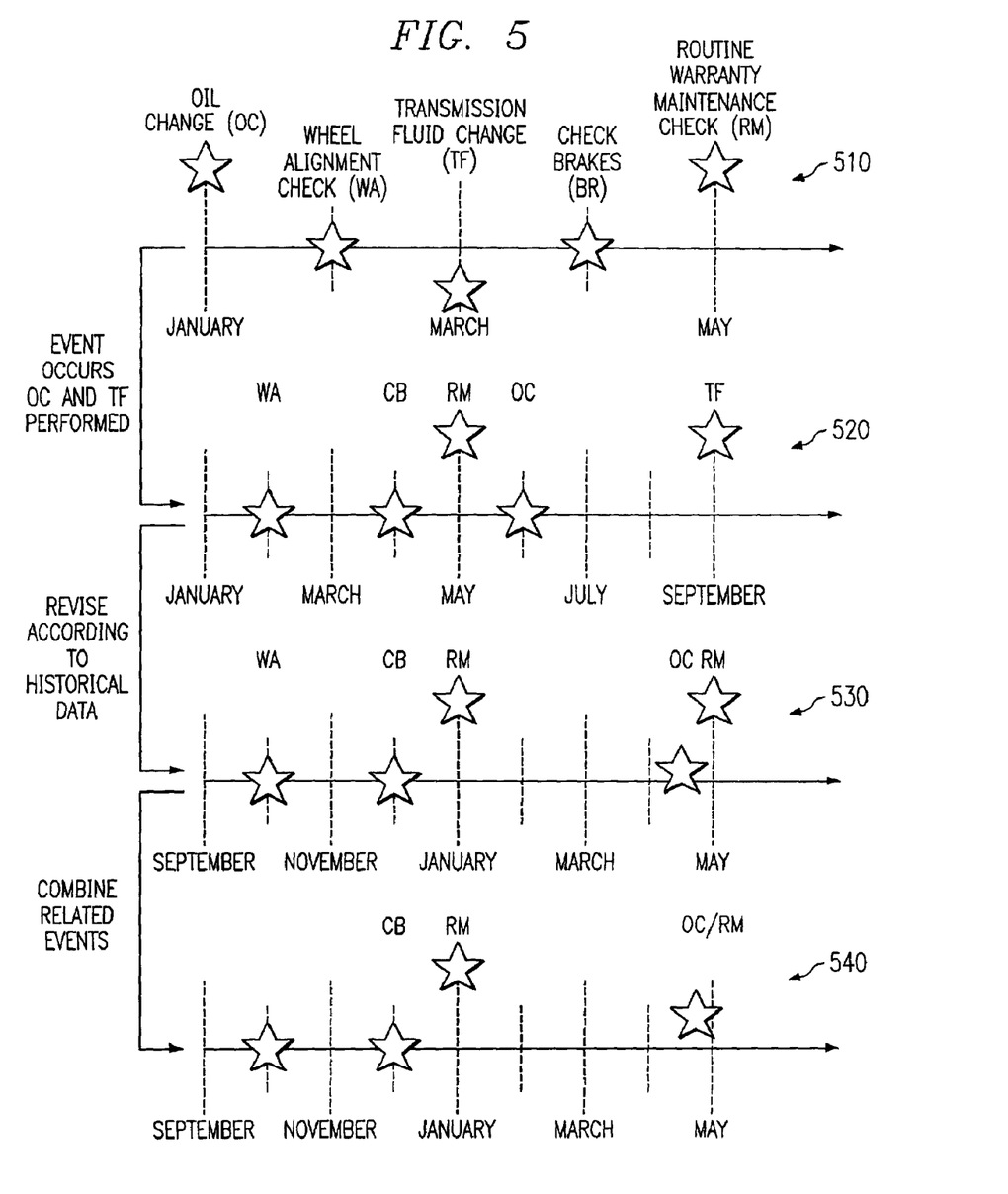
FIG. 5 is an example implementation of the present invention.

FIG. 5 is an exemplary diagram illustrating how an initial vehicle maintenance schedule may be actively adapted in accordance with the present invention. As shown in FIG. 5, an initial vehicle maintenance schedule 510 is generated in response to information input by a user. The user then goes into a mechanic shop and has the oil changed and transmission fluid flushed. The date of this maintenance is then reported to the active scheduler which generates an initial modified schedule 520 for the maintenance of the user's vehicle based on the information received and scheduler rules stored in the scheduler rules database 440. This initial modified schedule is then used as a basis upon which historical data modifications to the schedule are made.

The initial modified schedule 520 has a series of events and corresponding dates on which these events are scheduled to occur. These dates are used as input to historical data update rules in the scheduler rules database 440 to update the initial modified schedule based on historical data. In this way, the active scheduler predicts the occurrence of events in the future based on historical information and resolves conflicts between these predicted events and events in the initial modified schedule. If an event in the initial modified schedule conflicts with predicted events, the events in the initial modified schedule are rescheduled to an earliest time before or after the conflicting predicted event, depending on the particular situation.

Furthermore, if by resolving such conflicts with the scheduling of events, the result is that two or more related events are within a predetermined period of time of one another, and it is feasible to handle both events at substantially a same time, both events may be scheduled for the same time. For example, as shown in FIG. 5, the modified schedule 530 shows that the oil change (OC) has been rescheduled to the end of April, e.g., April 28, while the routine maintenance check has been scheduled for the beginning of May, e.g., May 1. If these two events are within a predetermined time period of one another, and owing to the fact that the oil change can be performed during a routine maintenance check, these two events may be combined into a composite event to occur on May 1, or at an average between the two dates, e.g. April 29 or April 30.

Once conflicts are resolved and events that can be combined are combined, a final modified schedule 540 is generated. The final modified schedule 540 is stored in the user profile database 430 and may be output to the user via the calendar device 450.

Figure 6:
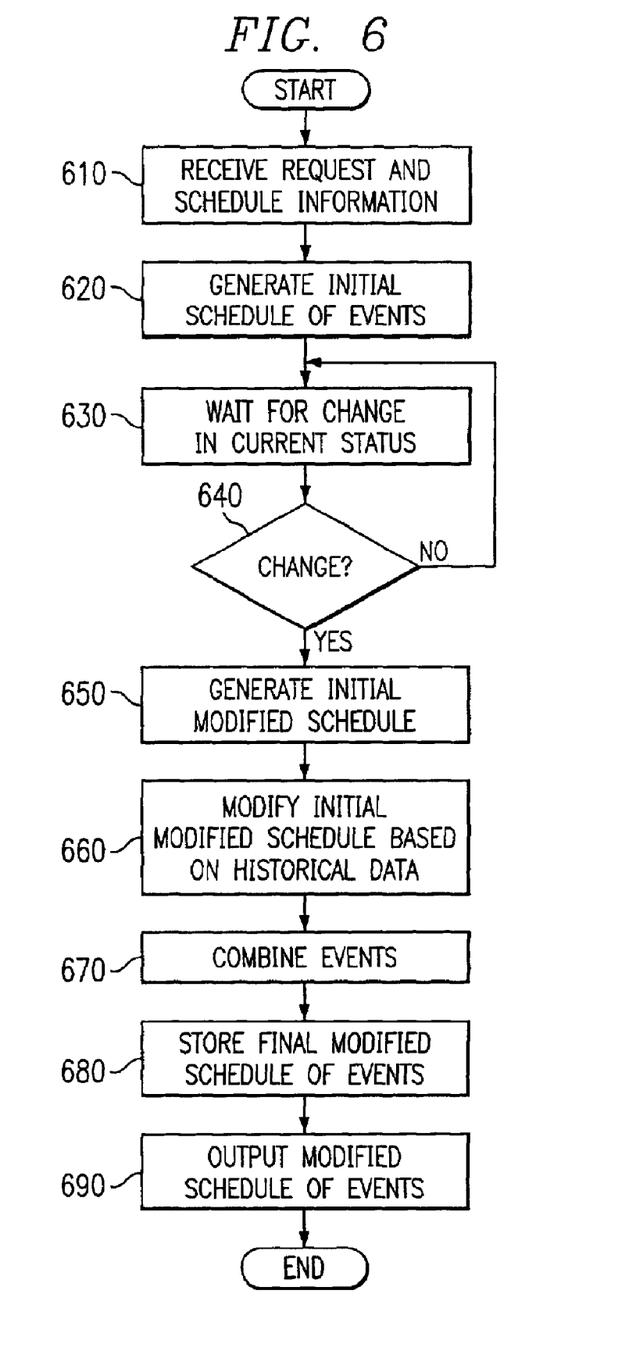
FIG. 6 is a flowchart outlining an exemplary operation of the present invention.

FIG. 6 is a flowchart outlining an exemplary operation of the present invention. As shown in FIG. 6, the operation starts with receiving schedule information and a request to generate a schedule (step 610). An initial schedule is generated based on the schedule information received and one or more scheduler rules (step 620). Thereafter, the operation waits for a change in current status of the subject of the scheduling (step 630). If a change in current status does not occurs (step 640), the operation returns to step 630 and continues to wait. If a change in current status does occur, an initial modified schedule is generated based on the initial schedule and the changed current status (step 650). The initial modified schedule is then modified based on historical data (step 660). Any events that can be combined are then combined in a manner described above (step 670) and the final modified schedule may then be stored (step 680) and output to the user (step 690) and the operation may then end.

The above provides a description of the mechanism by which the present invention may be used to actively schedule events based on changes in a current status and historical data. In addition to the actual scheduling of events, the present invention provides a mechanism by which these schedules may be distributed, as will be described hereafter.

There are many ways in which the schedules generated by the present invention may be distributed and used by users. Only some of these will be described here, however other mechanisms, as will be apparent to those of ordinary skill in the art, are intended to be within the spirit and scope of the present invention.

As mentioned above, the present invention may be implemented in a stand alone device or in a distributed network. In a distributed network the present invention may be implemented in a server device which is accessed by a user via the user's client device. In such an embodiment, a user establishes a user profile with a user profile database of the server. The user profile, as described above, includes one or more schedules that are maintained and updated in the manner described above.

When a user logs onto the system, the user is informed of the events that are to be performed within a predetermined time period. This predetermined time period and the events within the predetermined time period, are determined with the aid of a timing device. The user may then, through the client device, update the scheduling of events by inputting new status information to thereby cause the present invention to operate in the manner described above.

In addition to the distributed network embodiment described above, the present invention may be implemented as a software program in a stand alone computing device. This embodiment operates in much the same manner as the distributed network embodiment, however all functions are performed within a single stand alone device. Such a stand alone computing device may be a standard personal computer or a computer that is an integral part of a larger device. For example, the stand alone computing device may be an automobile computer which has a display within the dashboard of the automobile.

Alternatively, the stand alone computing device may be a smartcard that can be used in conjunction with a smartcard reader to present and update the schedules generated using the present invention. Such smartcards may be distributed to users upon the purchase of a device or the occurrence of an event requiring scheduling of future events. For example, a smartcard in accordance with the present invention may be distributed when a new automobile is purchased, when a baby is born (in the case of scheduling immunizations or doctor's visits), or the like.

As mentioned above, the scheduling of the present invention can be used to schedule events associated with inanimate objects, such as automobile maintenance and the like. However, the invention is not limited to such. As touched on above, the present invention may be used to schedule any event, including life-based events, such as baby immunizations, doctor's visits, and the like. The present invention is not limited to any particular type of event that is to be scheduled.

Thus, the present invention provides an active scheduler mechanism that may update schedules for long running processes having a plurality of events that may be interrelated. The mechanism of the present invention makes use of the current status of the subject of the scheduling as well as directly related or indirectly related historical information to modify the schedule in an adaptive manner. In this way, a dynamic scheduling mechanism that is not fixed, as in the known prior art, is obtained.

While the present invention has been described in terms of a vehicle maintenance scheduler, the present invention is not limited to any one particular application. Rather the present invention may be applied to any event-driven long running process that may be the subject of scheduling of events.

Furthermore, while the present invention has been described in terms of a scheduling rule base having rules that are used to determine how to schedule events, the present invention is not limited to this particular embodiment. Rather, any mechanism by which scheduling of events in accordance with the methodology of the present invention may be used without departing from the spirit and scope of the present invention. For example, rather than a set of scheduling rules, the present invention may use one or more algorithms to perform the scheduling of the present invention.

In addition, while the present invention has been described in terms of scheduling based on dates, the present invention is not limited to any particular time units. Rather, the present invention may make use of scheduling on an hourly, daily, weekly, monthly basis or the like. Any increment of time may be used without departing from the spirit and scope of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiments were chosen and described in order to best explain the principles of the invention, the practical application, and to enable others of ordinary skill in the art to understand the invention for various embodiments with various modifications as are suited to the particular use contemplated.

What is claimed is:

1. A method of actively scheduling a time based event driven process, comprising:
   receiving status update information;
   adapting an initial schedule of the time based event driven process based on the status update information to thereby generate in adapted schedule;
   modifying the adapted schedule based on historical information to thereby generate a modified schedule for the time based event driven process;
   determining if the status update information indicates that an event has been resolved within a window of opportunity associated with the event; and
   performing the steps of adapting and modifying only when the event has not been resolved within the window of opportunity.

2. The method of claim 1, wherein the status update information is received from a remote device.

3. The method of claim 1, further comprising outputting the modified schedule for the time based event driven process.

4. The method of claim 3, wherein the modified schedule for the time based event driven process is output to a client device.

5. The method of claim 3, wherein the modified schedule for the time based event driven process is output using a smartcard.

6. The method of claim 1, wherein at least one of the steps of adapting an initial schedule and modifying the adapted schedule are performed using one or more scheduling rules.

7. The method of claim 1, further comprising transmitting a request for current status information to a remote device, wherein the status update information is received film the remote device in response to the request for current status information being received by the remote device.

8. The method of claim 1, wherein modifying the adapted schedule based on historical information includes predicting whether another event will interfere with an event in the adapted schedule based on the historical information.

9. The method of claim 1, further comprising:
   determining if two or more events of the modified schedule may be combined; and
   combining the two or more events into a combined event if it is determined that the two or more events may be combined.

10. A computer program product in a computer readable medium for actively scheduling a time based event driven process, comprising:
    first instructions for receiving status update information;
    second instructions for adapting an initial schedule of the time based event driven process based on the status update information to thereby generate an adapted schedule;
    third instructions for modifying the adapted schedule based on historical information to thereby generate a modified schedule for the time based event driven process;
    fourth instructions for determining if the status update information indicates that an event has been resolved within a window of opportunity associated with the event; and
    fifth instructions for performing the steps of adapting and modifying only when the event has not been resolved within the window of opportunity.

11. The computer program product of claim 10, wherein the status update information is received from a remote device.

12. The computer program product of claim 10, further comprising fourth instructions for outputting the modified schedule for the time based event driven process.

13. The computer program product of claim 12, wherein the modified schedule for the time based event driven process is output to a client device.

14. The computer program product of claim 12, wherein the modified schedule for the time based event driven process is output using a smartcard.

15. The computer program product of claim 10, wherein at least one of the second instructions and the third instructions are executed using one or more scheduling rules.

16. The computer program product of claim 10, further comprising fourth instructions for transmitting a request for current status information to a remote device.

17. The computer program product of claim 10, wherein the third instructions include instructions for predicting whether another event will interfere with an event in the adapted schedule based on the historical information.

18. The computer program product of claim 10, further comprising:
fourth instructions for determining if two or more events of the modified schedule may be combined; and
fifth instructions for combining the two or more events into a combined event if it is determined that the two or more events may be combined.

19. An apparatus for actively scheduling a time based event driven process, comprising:
a remote device interface that receiving status update information; and
a controller coupled to the remote device interface, wherein the controller adapts an initial schedule of the time based event driven process based on the status update information to thereby generate an adapted schedule, modifies the adapted schedule based on historical information to thereby generate a modified schedule for the time based event driven process, determines if the status update information indicates that an event has been resolved within a window of opportunity associated with the event and adapts the initial schedule and modifies the adapted schedule only when the event has not been resolved within the window of opportunity.

20. The apparatus of claim 19, wherein the status update information is received from a remote device.

21. The apparatus of claim 19, further comprising an output device that outputs the modified schedule for the time based event driven process.

22. The apparatus of claim 21, wherein the output device is a display device that displays the modified schedule for the time based event driven process.

23. The apparatus of claim 21, wherein the output device is a smartcard device which encodes the schedule on a smartcard.

24. The apparatus of claim 19, wherein the controller uses one or more scheduling rules to perform at least one of adapting an initial schedule and modifying the adapted schedule.

25. The apparatus of claim 19, wherein the controller transmits a request for current status information, to a remote device via the remote device interface, and wherein the status update information is received from the remote device in response to the request for current status information being received by the remote device.

26. The apparatus of claim 19, wherein the controller modifies the adapted schedule based on historical information by predicting whether another event will interfere with an event in the adapted schedule based on the historical information.

27. The apparatus of claim 19, wherein the controller determines if two or more events of the modified schedule may be combined and combines the two or more events into a combined event if it is determined that the two or more events may be combined.

28. A method of actively scheduling a time based event driven process comprising:
receiving status update information;
adapting an initial schedule of the time based event driven process based on the status update information to thereby generate an adapted schedule; and
modifying the adapted schedule based on historical information to thereby generate a modified schedule for the time based event driven process, wherein the time based event driven process includes a plurality of scheduled events, wherein a change to a performance time of one scheduled event affects a performance of another scheduled event at its initially scheduled time of performance, and wherein adapting the initial schedule of the time based event driven process includes:
modifying a time of performance of a first scheduled event in the plurality of scheduled events to be a first modified time of performance; and
modifying a time of performance of a second scheduled event in the plurality of scheduled events based on the modification to the time of the first scheduled event to be a second modified time of performance, and
wherein modifying the adapted schedule based on historical information to generate a modified schedule for the time based event driven process includes modifying at least one of the first modified time of performance and the second modified time of performance to be a third modified time of performance.

29. A computer program product in a computer readable medium for actively scheduling a time based event driven process, comprising:
first instructions for receiving status update information;
second instructions for adapting an initial schedule of the time based event driven process based on the status update information to thereby generate an adapted schedule; and
third instructions for modifying the adapted schedule based on historical information to thereby generate a modified schedule for the time based event driven process, wherein the time based event driven process includes a plurality of scheduled events, wherein a change to a performance time of one scheduled event affects a performance of another scheduled event at its initially scheduled time of performance, and wherein the second instructions for adapting the initial schedule of the time based event driven process include:
instructions for modifying a time of performance of a first scheduled event in the plurality of scheduled events to be a first modified time of performance; and
instructions for modifying a time of performance of a second scheduled event in the plurality of scheduled events based on the modification to the time of the first scheduled event to be a second modified time of performance, and wherein the third instructions for modifying the adapted schedule based on historical information to generate a modified schedule for the time based event driven process include instructions for modifying at least one of the first modified time of performance and the second modified time of performance to be a third modified time of performance.

30. A apparatus for actively scheduling a time based event driven process, comprising:
a remote device interface that receiving status update information; and
a controller coupled to the remote device interface, wherein the controller adapts an initial schedule of the time based event driven process based on the status update information to thereby generate an adapted schedule, and modifies the adapted schedule based on historical information to thereby generate a modified schedule for the time based event driven process, wherein the time based event driven process includes a plurality of scheduled events, wherein a change to a performance time of one scheduled event affects a performance of another scheduled event at its initially scheduled time of performance and wherein the controller adapts the initial schedule of the time based event driven process by:

modifying a time of performance of a first scheduled event in the plurality of scheduled events to be a first modified time of performance; and modifying a time of performance of a second scheduled event in the plurality of scheduled events based on the modification to the time of the first scheduled event to be a second modified time of performance, and wherein the controller modifies the adapted schedule based on historical information to generate a modified schedule for the time based event driven process by modifying at least one of the first modified time of performance and the second modified time of performance to be a third modified time of performance.

* * * * *

UNITED STATES PATENT AND TRADEMARK OFFICE
CERTIFICATE OF CORRECTION

PATENT NO. : 6,948,171 B2
DATED : September 20, 2005
INVENTOR(S) : Dan et al.

It is certified that error appears in the above-identified patent and that said Letters Patent is hereby corrected as shown below:

Column 10,
Line 17, after "received" delete "film" and insert -- from --.

Column 12,
Line 56, after "30." delete "A" and insert -- An --.

Signed and Sealed this

Eleventh Day of April, 2006

JON W. DUDAS
*Director of the United States Patent and Trademark Office*

Disclaimer

6,948,171 B2 — Asit Dan, Pleasantville, NY (US); Daniel Manual Dias, Mohegan Lake, NY (US). APPARATUS, SYSTEM AND METHOD FOR ACTIVE SCHEDULING OF TIME-BASED EVENT-DRIVEN LONG RUNNING PROCESSES. Patent dated September 20, 2005. Disclaimer filed October 6, 2006, by the assignee, International Business Machines Corporation.

Hereby enters this disclaimer to claims 1-30, of said patent.

(*Official Gazette October 14, 2008*)